United States Patent
Stewart et al.

(10) Patent No.: US 6,539,948 B1
(45) Date of Patent: Apr. 1, 2003

(54) SUCTION BAND FOR A CIGARETTE MAKING MACHINE

(75) Inventors: David Bruce Stewart, Blairgowrie (GB); John Dawson, Northants (GB)

(73) Assignee: Stewart Fibre Control Limited, Perthshire (GB)

(*) Notice: Subject to any disclaimer, the term of this patent is extended or adjusted under 35 U.S.C. 154(b) by 0 days.

(21) Appl. No.: 09/509,300

(22) PCT Filed: Sep. 23, 1998

(86) PCT No.: PCT/GB98/02827

§ 371 (c)(1),
(2), (4) Date: Jun. 1, 2000

(87) PCT Pub. No.: WO99/15037

PCT Pub. Date: Apr. 1, 1999

(30) Foreign Application Priority Data

Sep. 23, 1997 (GB) .............................. 9720116

(51) Int. Cl.[7] .............................. A24C 5/18; B32B 3/02; B65G 15/30
(52) U.S. Cl. ............... 131/84.1; 131/84.3; 162/900; 198/844.1; 428/132
(58) Field of Search .................. 428/98, 131, 132, 428/134, 135, 136; 156/251, 252; 264/154; 198/844.1, 844.2, 689.1; 131/84.3, 108, 110, 31, 84.1; 162/900

(56) References Cited

U.S. PATENT DOCUMENTS 3,399,111 A * 8/1968 Beaumont et al.
3,617,442 A * 11/1971 Hurschman
3,750,678 A * 8/1973 Labbe
4,300,982 A * 11/1981 Romanski
4,541,895 A * 9/1985 Albert
4,758,297 A 7/1988 Calligarich ................. 156/251
4,925,729 A * 5/1990 O'Connor
5,066,531 A 11/1991 Legg et al. ................. 428/131
5,087,327 A * 2/1992 Hood
5,119,938 A * 6/1992 Beckh et al.
5,413,121 A * 5/1995 Dawson et al.
5,533,941 A * 7/1996 Heim
5,731,059 A * 3/1998 Smith et al.
5,837,102 A * 11/1998 Graf
6,186,315 B1 * 2/2001 Schmick

FOREIGN PATENT DOCUMENTS

FR   1238895    *  7/1960
GB   2241915    *  9/1991
WO   97/30604      8/1997   ............ A24C/5/18

* cited by examiner

Primary Examiner—Steven P. Griffin
Assistant Examiner—Carlos Lopez
(74) Attorney, Agent, or Firm—Fish & Richardson P.C.

(57) ABSTRACT

A suction band, for use in a cigarette making machine for conveying a cigarette filler stream, comprising a tape of heat-softenable plastics material wound so as to produce a multi-layer endless band and having perforations of which the edges of the adjacent perforations in adjacent tape layers are welded or fused together so as to join together the tape layers to form a cohesive perforated band.

7 Claims, 1 Drawing Sheet

SUCTION BAND FOR A CIGARETTE MAKING MACHINE

Cigarette making machines commonly operate by forming a filler stream of tobacco on a suction band which then carries the filler stream into a garniture in which the filler stream is enclosed in a paper wrapper to form a continuous cigarette rod. That rod is then cut at regular intervals into predetermined lengths. Examples of such a machine are described in British patents Nos. 2023401 and 2087213.

Suction bands for cigarette making machines have in the past commonly been made of metal (usually Nickel) formed with perforations so as to be air-pervious, or have been in a woven nylon form. Both of these band constructions are fairly expensive.

A suction band according to the present invention, for use in a cigarette making machine for conveying a cigarette filler stream, comprises a tape of heat-softenable plastics material wound so as to produce a multi-layer endless band and having perforations of which the edges of the adjacent perforations in adjacent tape layers are welded or fused together so as to join together the tape layers to form a cohesive perforated band.

The perforations are preferably formed by pins which are heated so as to melt and thus weld together the adjacent tape layers while forming the perforations. During manufacture the pins preferably penetrate the band from the inside so as to deform outwards melted portions of the band, thus forming a rough surface helpful in driving the tobacco forward during use. For example, the perforations may be formed by pins with their axes inclined to the normal (with respect to the plane of the adjacent portion of the band) so as to form annular crater-like protrusions around the perforations which are higher on the downstream sides of the perforations than on the upstream sides (or vice versa), the term "upstream" being used here in relation to the intended direction of movement of the band during use; such protrusions minimise any tendency for strands of tobacco to block the perforations and thus reduce the air flow through them.

Alternatively, pins may be used to form the perforations and may be ultrasonically vibrated so as to melt or fuse the edges of the perforations.

Another possibility is that the perforations may be formed by a laser. In this case in particular, at least the outer surface of the band may be made rough or uneven, before perforating, to facilitate forward driving of the tobacco. For example, the band may be driven between pinching rolls (heated or ultrasonically vibrated) to form a dimpled, undulating or knurled surface on the band.

An ultrasonic device may in any event be used to weld or fuse together the tape layers around their entire surfaces or along longitudinally striped areas (including, for example, the band edges), before, during or after the perforating stage.

In the case of a laser perforator, the pattern and/or size of the perforations can readily be changed to suit, for example, the needs arising with different tobaccos or in different cigarette making machines.

The outer end of the tape preferably lies in a trailing fashion in relation to the direction of movement of the band. It may be secured by additional welding along the end edge (eg by a hot blade or laser) or may be held in position purely or mainly by the adjacent perforations.

For economy of manufacture, a multiple-width band may be formed initially, with longitudinally extending perforated areas separated by non-perforated areas which will form the edges of the individual bands. Subsequent slitting of the multiple-width band to produce individual bands may be achieved by a hot disc knife, laser or ultrasonic device so as to weld the edges of the bands.

Examples of suction bands according to this invention, and of possible methods of manufacture, will now be described with reference to the accompanying drawings. In these drawings.

Figure 1:
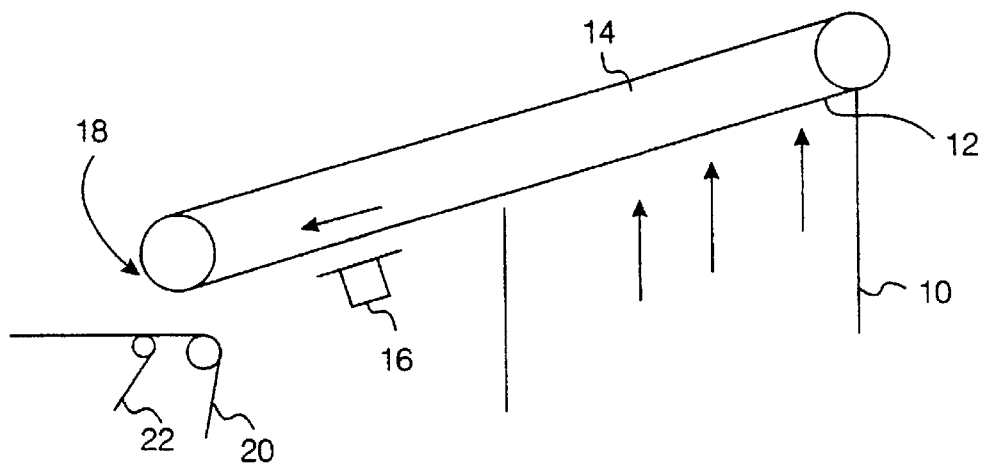
FIG. 1 is a diagrammatic illustration of a typical cigarette making machine.

FIG. 1 illustrates a cigarette making machine which forms a filler stream by showering tobacco pneumatically upwards through a chimney 10 and onto a suction band 12. Suction applied through the band from a suction chamber 14 holds the filler stream on the band while it is trimmed by a trimming device 16 and during further conveyance towards a garniture device (not shown) in a region 18 in which the filler stream is enclosed in a paper web 20. This web is carried through the garniture by a garniture tape 22.

Figure 2:
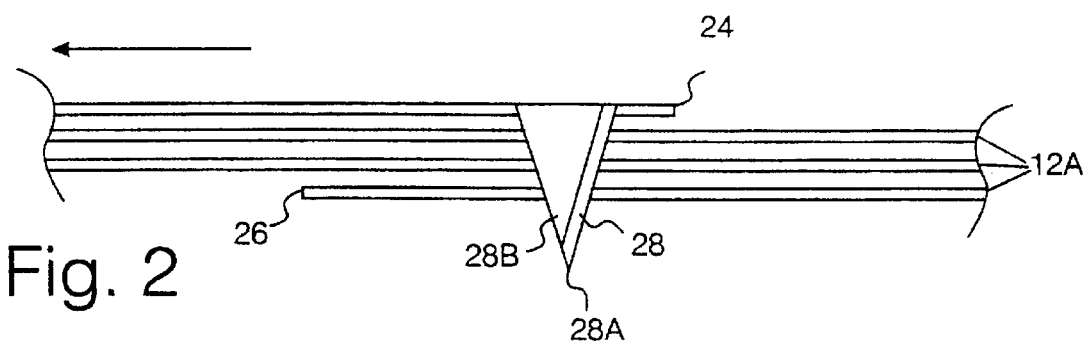
FIG. 2 is a longitudinal section through one of the perforations in the suction band.

FIG. 2 is an enlarged longitudinal section through one of the perforations close to the outer end 24 of the tape forming the band. FIG. 2 also shows the inner end 26 of the tape, though that need not necessarily be in the position shown. The band is formed (in the example shown) by three layers 12A of tape formed by three windings of tape during the manufacture of the band.

One of the many perforations in the band is shown in FIG. 2. It has been formed by an inclined pin (ie a pin penetrating the band while its axis is inclined to a normal to the band). Thus the material melted by the hot pin forms a protrusion 28 which, in the example shown, reaches full height on the downstream side of the perforation, and has no height at all on the upstream side. That is to say, the highest point of the edge of the protrusion is at position 28A, and the remainder of the edge slopes downwards from that highest point, on both sides, as indicated by the line 28B. The "roughness" presented by such perforations is helpful in driving forwards the initial particles of tobacco which land on the band. Moreover, as already explained, the fact that the outer mouth of the perforation (represented by the line 28B) is inclined or approximately transverse to the general surface of the band is helpful in minimising the chance of a strand of tobacco blocking the flow of air through the perforation.

As shown in FIG. 2, the perforations have a tapered cross-section and are thus self-cleaning. Any particles of tobacco that enter them are readily sucked out.

The material of the band is preferably polypropylene. However, any other plastics material capable of behaving in approximately the same way while being perforated can, in principle, be used, subject to suitability for use in a cigarette making machine. Some types of Nylon, for example, can be used, though careful selection is needed to ensure that the perforating pins at a temperature suitable to melt the material while forming the perforations can be at a temperature which does not risk any significant conversion of the material into gaseous form.

Polypropylene is particularly suitable. It can be and is preferably stretched longitudinally before being used, so as to align the molecules longitudinally and thus increase the longitudinal strength. The stretch ratio may, for example, be approximately 5:1 or more generally between 4:1 and 10:1. An advantage of a stretched polypropylene band made in this way is that it tends to shrink, rather than stretch, on becoming hot during use. This avoids complications which occur with Nylon bands (which stretch) in regard to the need to maintain adequate tension as the band warms up.

Figure 3:
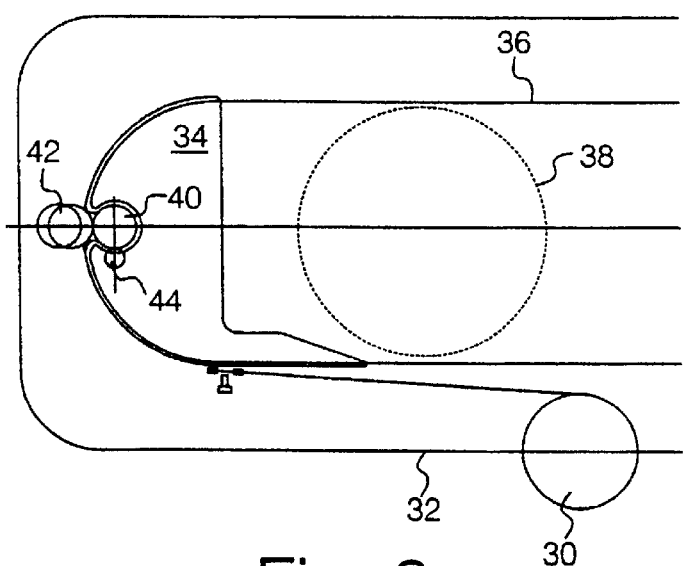
FIG. 3 shows a possible apparatus for manufacturing suction bands according to this invention.

FIG. 3 shows one possible form of apparatus for making bands according to this invention.

As shown in FIG. 3, a reel 30 of polypropylene tape (already stretched) is driven, for example by a belt or chain, along a track 32 extending around a semi-cylindrical fixed guide 34 and a drive roller (not shown) defining the ends of the loop locus of a band 36. The example shown is for the manufacture of a relatively long band; in the case of a shorter band, the drive roller can be in the position shown by the dotted outline 38.

It should be understood that the reel 30 is driven along the path 32 in the direction of the adjacent arrow so as to wind the tape around the guide 34 and drive roller. For example, it may be used to form a three-layer band, as shown in FIG. 2. After an initial layer has been set in position (possibly manually), the inner end of the tape may be spot welded to the beginning of the next turn, and the outer end of the tape may similarly be spot welded in position before the band is driven around the guide 34 in order for perforations to be formed by a pinned roller 40. During that perforating stage, the band is deflected towards the roller 40 by a brush roller 42 which is placed in position after the tape has been fully wound to form the band. The band is driven, during this perforating stage, both by the drive roller 38 and by the pinned roller 40.

The pins on the roller 40 may, for example, each have its axis inclined to a radius by up to 60° in order to form perforations such as are shown in FIG. 2. The pins are preferably of steel and are heated by hot air passing through a passage 44 formed in the guide 34 so as to enter along the roller 40.

The cross-sectional shape of the pins may, for example, be circular or rectangular.

What is claimed is:

1. A suction band, for use in a cigarette making machine for conveying a cigarette filler stream, comprising a tape of heat-softenable plastics material wound so as to produce a multi-layer endless band and having perforations of which edges of adjacent perforations in adjacent tape layers are welded or fused together so as to join together the tape layers to form a cohesive perforated band, the perforations having annular protrusions to cause one surface of the band to be roughened.

2. A suction band as claimed in claim 1, in which said annular protrusions are higher on a downstream side of the perforation than on an upstream side, or vice versa.

3. A suction band as claimed in claim 1, in which the edge of the protrusion of each perforation lies in a protrusion plane, which is inclined with respect to a plane of an upper surface of the band.

4. A suction band as claimed in claim 3, in which said protrusion plane of all the perforations are inclined in the same respect.

5. A suction band as claimed in claim 3, in which a line of intersection between said protrusion plane and the plane of the upper surface of the band is in each case transverse the band.

6. A suction band as claimed in claim 1, in which the layers are welded or fused together along at least one stripe around the length of the band.

7. A suction band as claimed in claim 6, in which a welded or fused stripe is formed along each edge of the band.

\* \* \* \* \*